(12) United States Patent  
Peacock et al.

(10) Patent No.: US 8,546,963 B2  
(45) Date of Patent: Oct. 1, 2013

(54) GENERATOR FRAME WITH GRAPPLING ATTACHMENT FEATURE AND THEFT DETERRING WEIGHT RECEPTACLE

(75) Inventors: Douglas G. Peacock, PeeWee Valley, KY (US); Charles Derek Hibdon, Lousiville, KY (US)

(73) Assignee: Safecross Solutions, LLC, Pewee Valley, KY (US)

( * ) Notice: Subject to any disclaimer, the term of this patent is extended or adjusted under 35 U.S.C. 154(b) by 526 days.

(21) Appl. No.: 12/763,757

(22) Filed: Apr. 20, 2010

(65) Prior Publication Data

US 2010/0264669 A1    Oct. 21, 2010

Related U.S. Application Data

(60) Provisional application No. 61/171,319, filed on Apr. 21, 2009.

(51) Int. Cl.
*F02B 63/04* (2006.01)

(52) U.S. Cl.
USPC .............................. 290/1 A; 123/3

(58) Field of Classification Search
USPC ........................... 290/1 A; 123/2
See application file for complete search history.

(56) References Cited

U.S. PATENT DOCUMENTS

| | | | | |
|---|---|---|---|---|
| 4,721,070 A | * | 1/1988 | Tanaka et al. | 123/2 |
| 4,835,405 A | * | 5/1989 | Clancey et al. | 290/1 A |
| 5,555,853 A | * | 9/1996 | Bowen et al. | 123/2 |
| 5,697,249 A | * | 12/1997 | Miguchi | 74/16 |
| 6,039,009 A | * | 3/2000 | Hirose | 123/2 |
| 6,084,313 A | * | 7/2000 | Frank | 290/40 C |
| 6,758,169 B2 | * | 7/2004 | Suzuki et al. | 123/3 |
| 6,801,425 B2 | * | 10/2004 | Buck et al. | 361/625 |
| 6,952,056 B2 | * | 10/2005 | Brandenburg et al. | 290/1 A |
| 7,089,889 B2 | * | 8/2006 | Johnson et al. | 123/2 |
| 7,105,774 B2 | * | 9/2006 | Bender et al. | 219/133 |
| 7,482,706 B2 | * | 1/2009 | Uchimi et al. | 290/1 A |
| 7,868,269 B2 | * | 1/2011 | Silvestro | 219/133 |
| 8,282,363 B2 | * | 10/2012 | Ohi et al. | 417/234 |
| 2008/0252080 A1 | * | 10/2008 | Xiao | 290/1 A |

\* cited by examiner

*Primary Examiner* — Michael Zarroli
(74) *Attorney, Agent, or Firm* — Nexsen Pruet, LLC; Timothy D. St. Clair

(57) ABSTRACT

An improved generator frame includes a grappling attachment feature and theft-deterring weight receptacle for adding weight on-site. In one method of using the improved generator frame, concrete or metal components may added to the weight receptacle to increase the overall weight of a generator assembly to deter its theft.

2 Claims, 8 Drawing Sheets

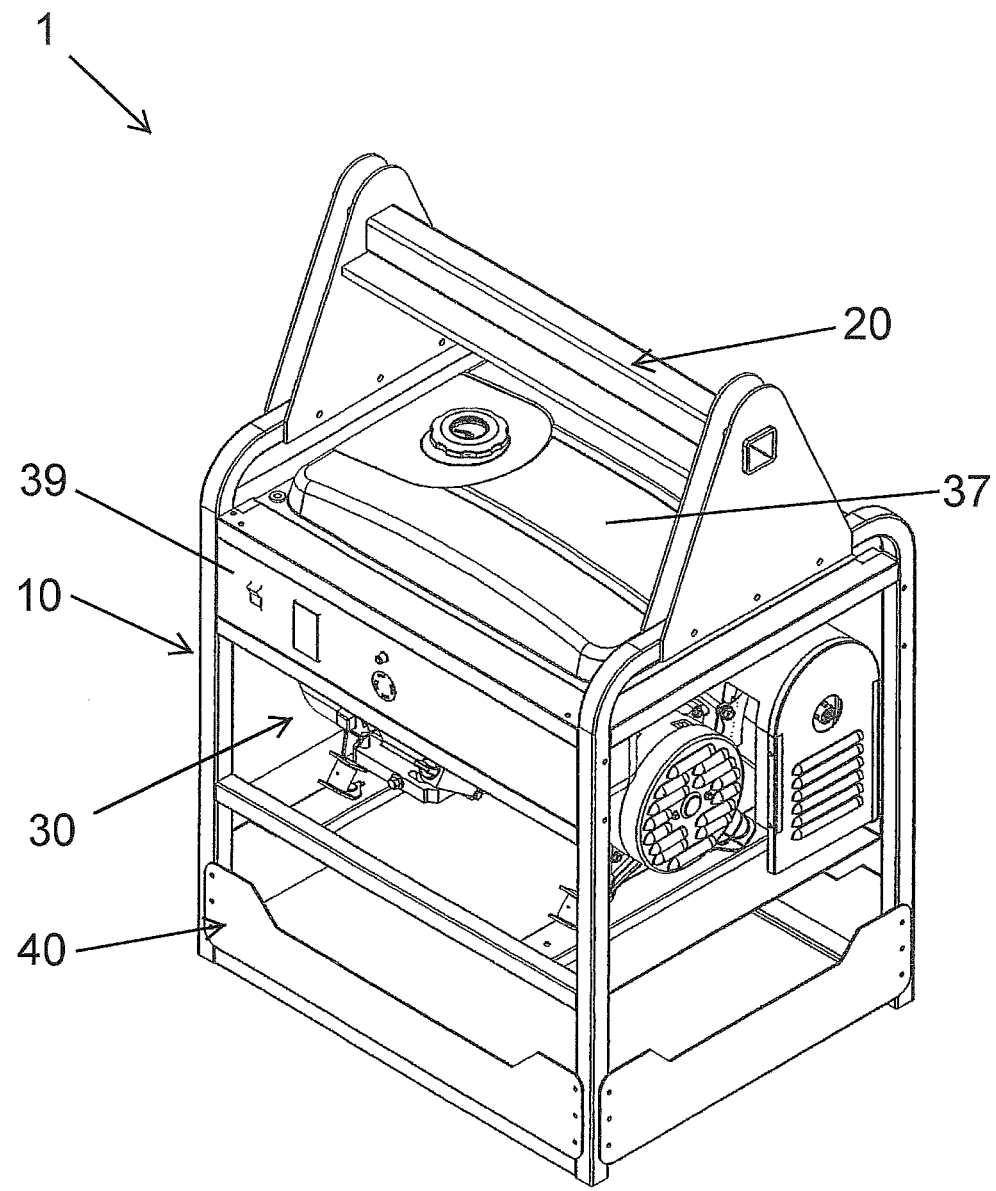
- FIGURE 1 -

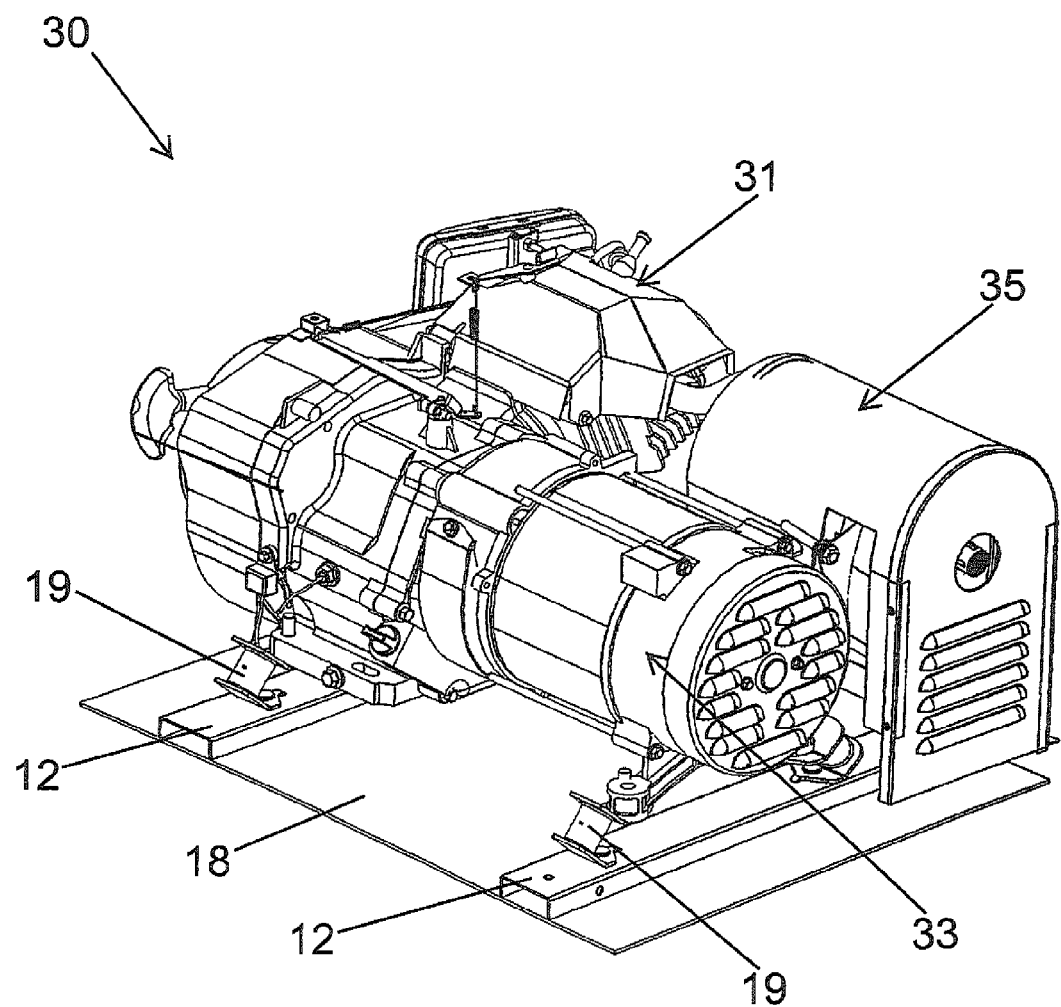
- FIGURE 2 -

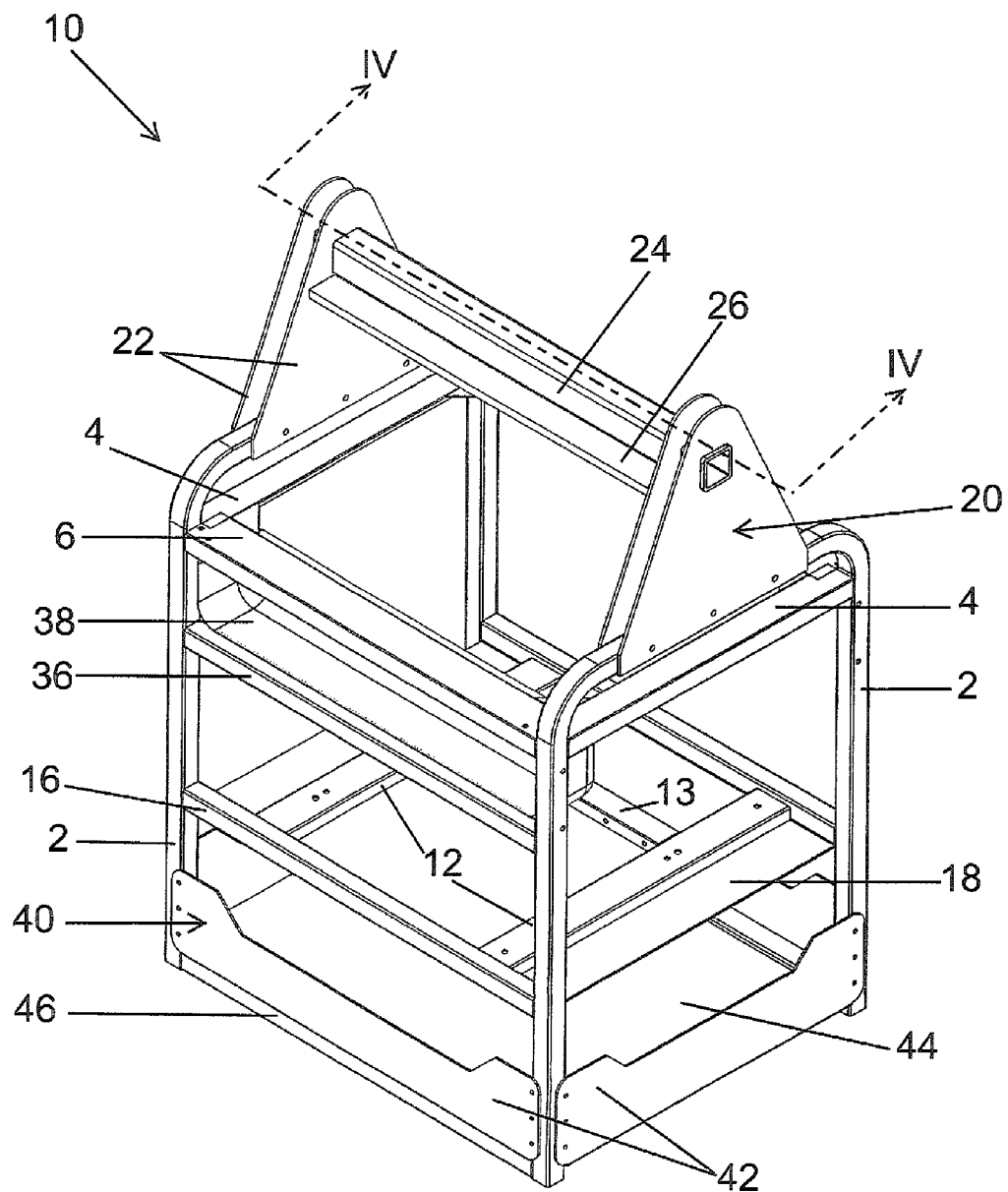
- FIGURE 3 -

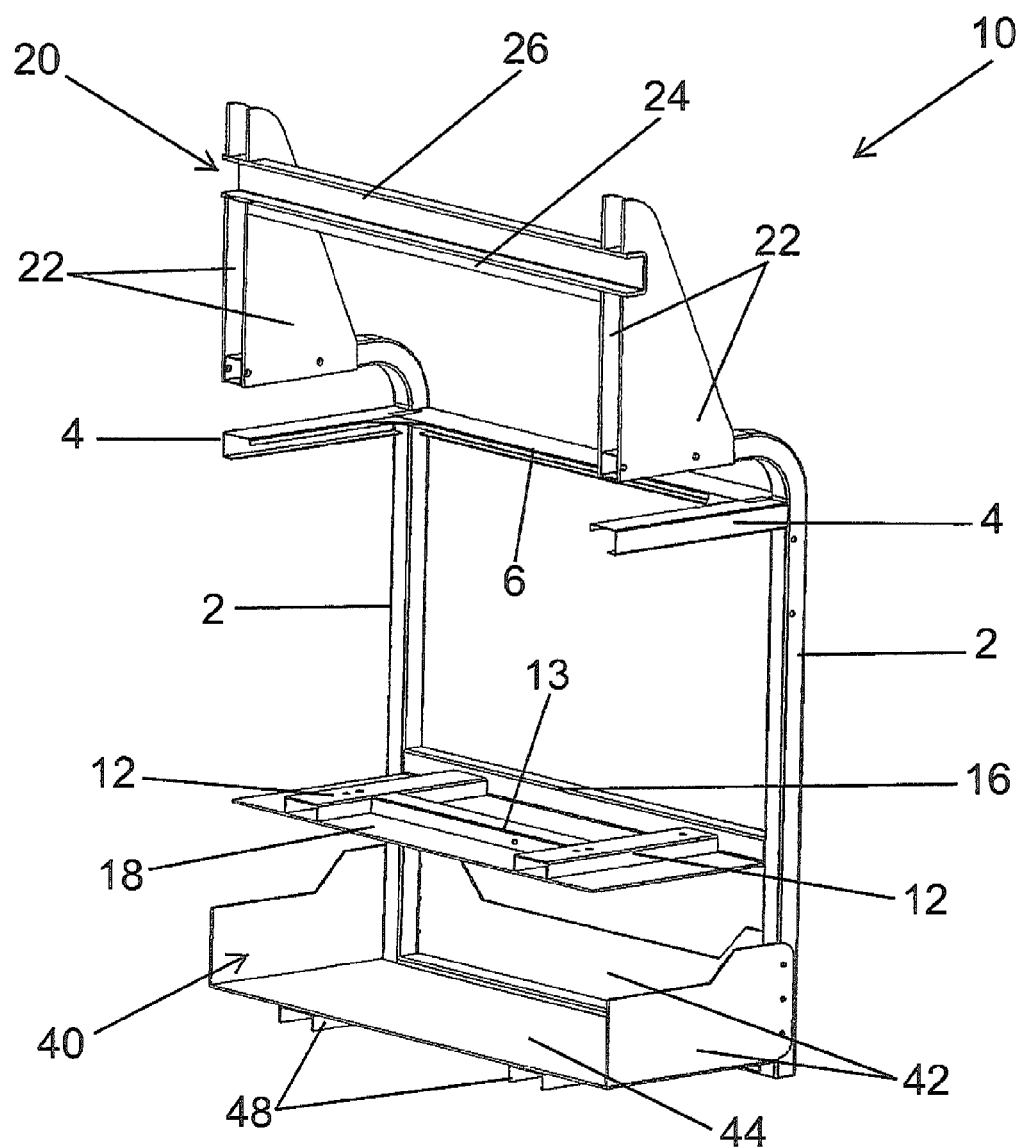
- FIGURE 4 -

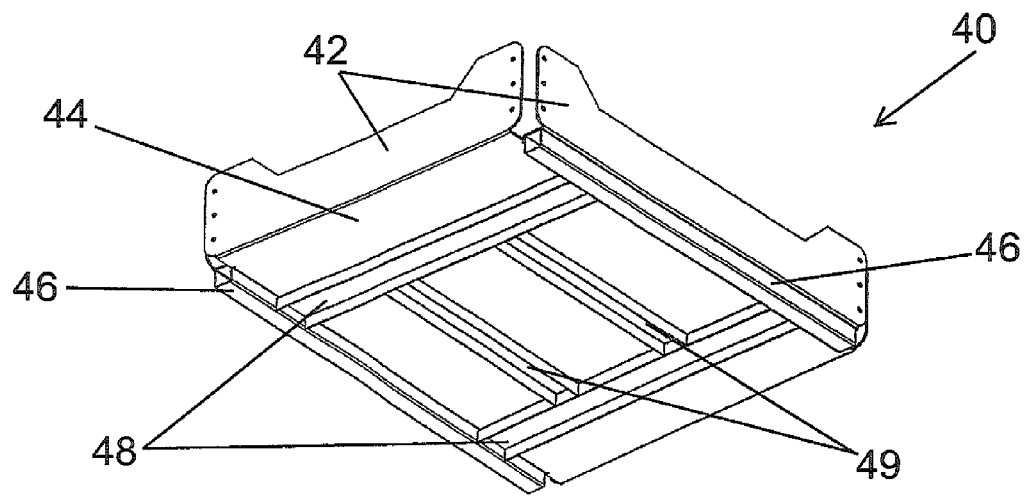
- FIGURE 5 -
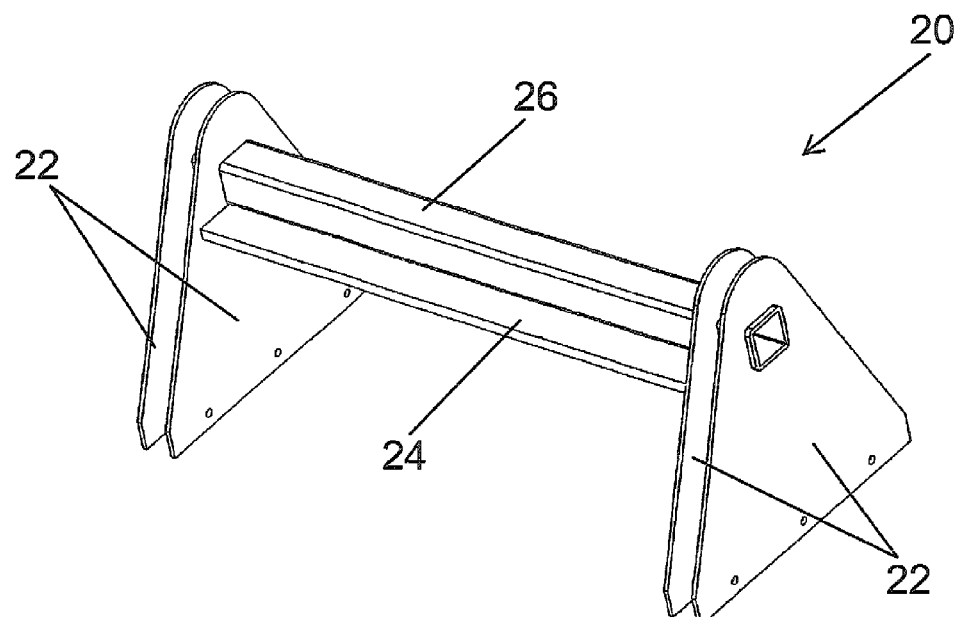
- FIGURE 6 -

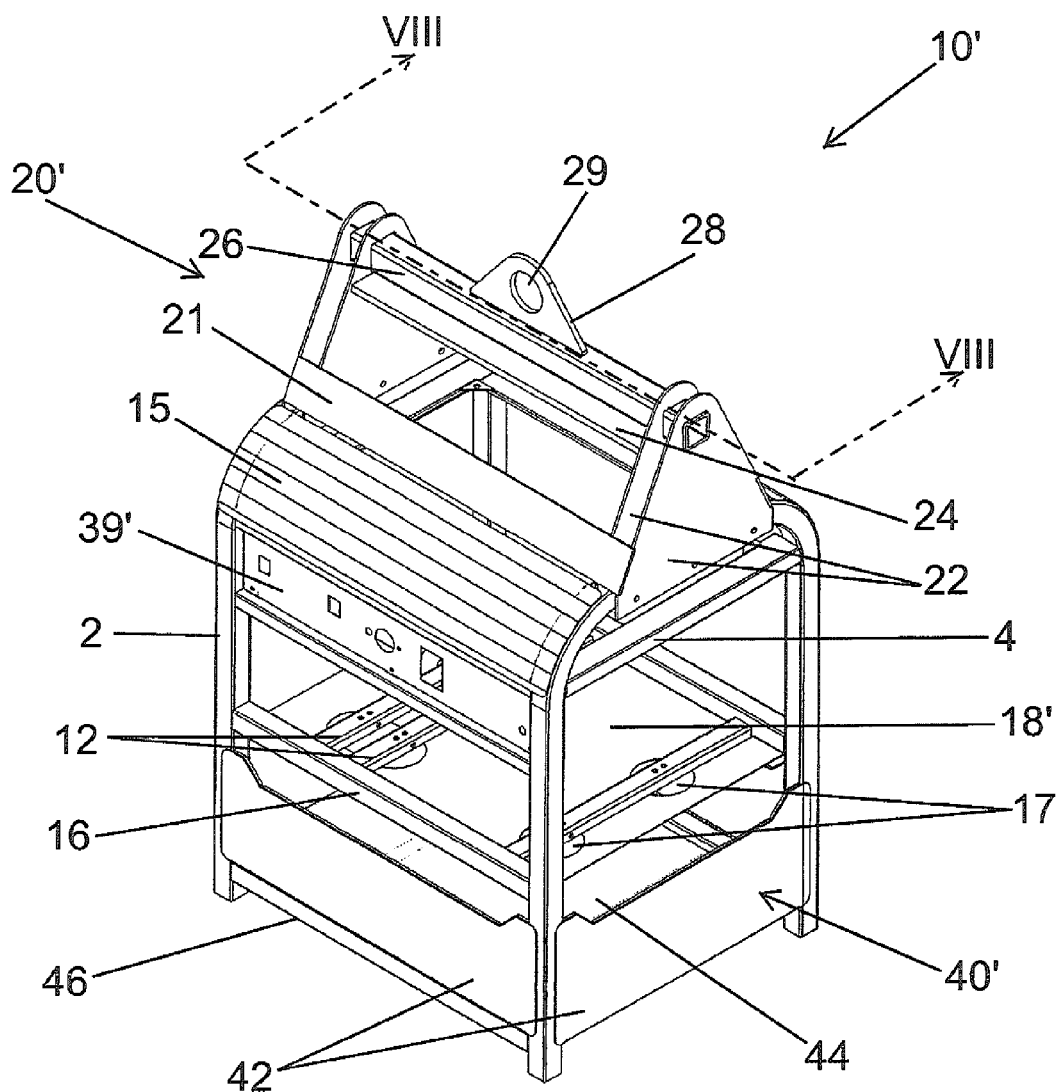
- FIGURE 7 -

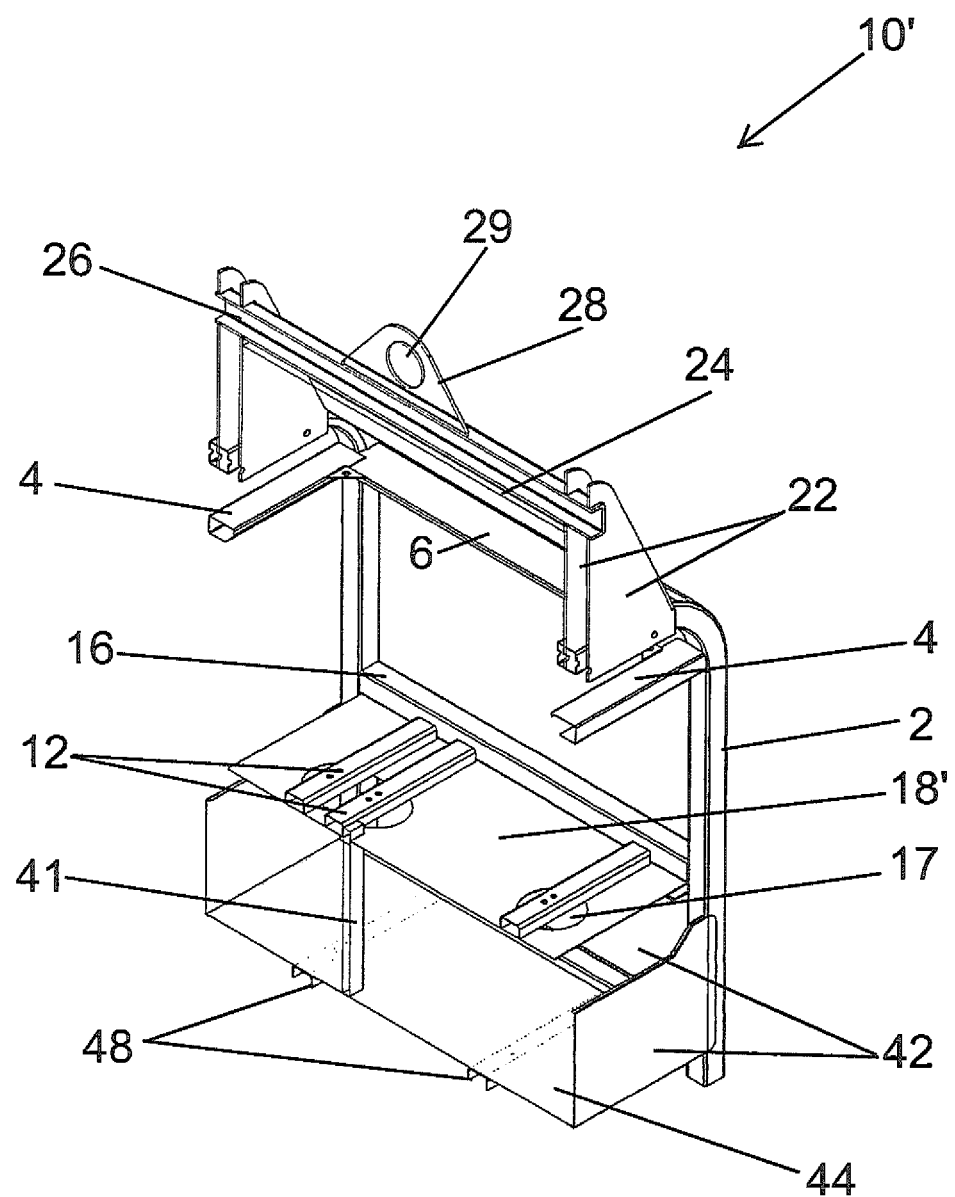
- FIGURE 8 -

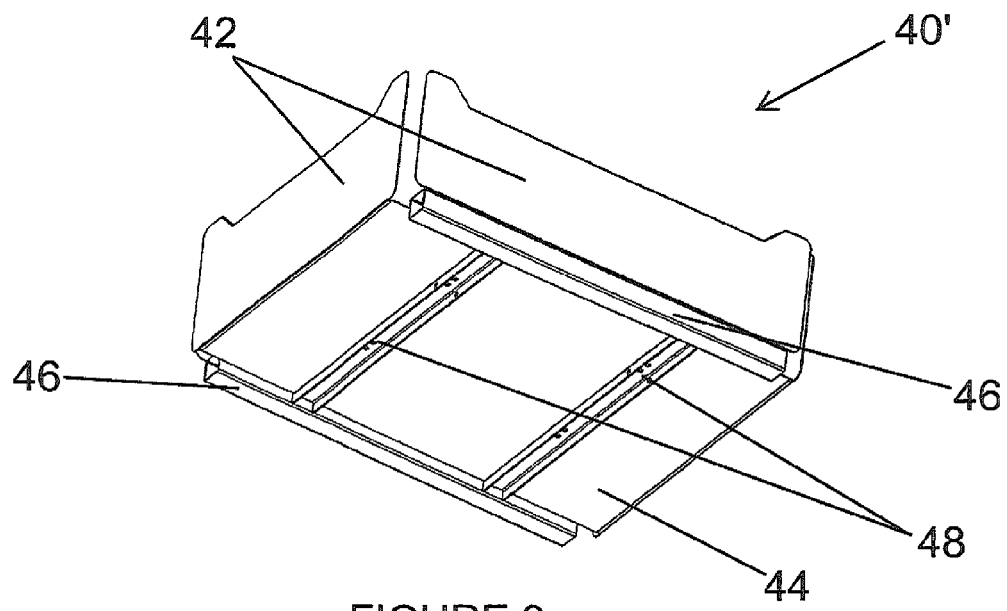
- FIGURE 9 -
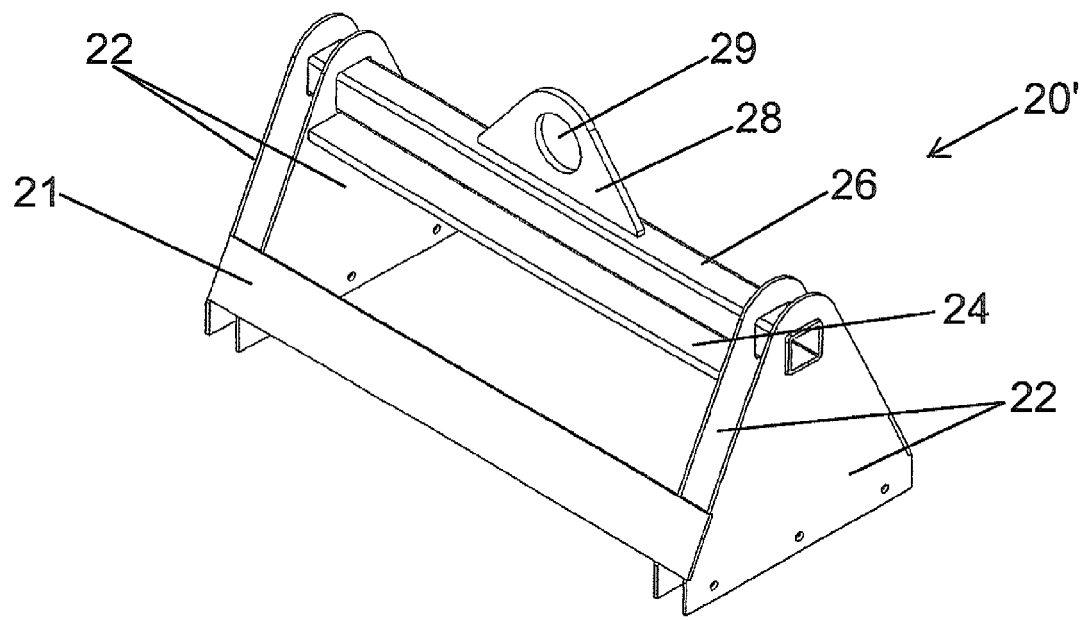
- FIGURE 10 -

GENERATOR FRAME WITH GRAPPLING ATTACHMENT FEATURE AND THEFT DETERRING WEIGHT RECEPTACLE

CROSS-REFERENCE TO RELATED APPLICATIONS

The present application is a non-provisional application claiming priority to U.S. Provisional Patent Application Ser. No. 61/171,319, filed Apr. 21, 2009, the disclosure of which is hereby incorporated by reference.

BACKGROUND

Portable power generation units, or generators, are commonly used in or around work sites or construction sites to provide temporary electrical power. It is often necessary or desirable to relocate a generator to provide power to different projects around the site. Additionally, due to its inherent value, the generator may be a target for theft, or vandalism to strip it of valuable parts. Construction workers, therefore, may hoist the generator above the ground for temporary storage when the construction site is unmanned (such as during an overnight period). For these reasons, the top of a generator may be provided with an eyelet for attachment to a crane hook.

At least one drawback with the typical crane hook eyelet is that the eyelet tends to be large and bulky to accommodate the crane hook. Furthermore, the conventional eyelet is fixed in place and projects well above a top surface of the generator to ease attachment of the crane hook. Accordingly, the projecting eyelet is often in the way.

Moreover, many cranes, trucks and other moving equipment typically found at construction sites are often equipped with grappling arms, which may not be suited to grappling conventional generator eyelets.

What is needed in the industry is a relatively low-profile attachment system for a generator that can be handled by crane hooks and grappling arms. Additionally, the generator should be susceptible to substantially increasing its weight on site to deter theft.

SUMMARY

A generator assembly is provided herein, which includes a generator and a frame. The generator is equipped with an engine, an alternator, and a muffler. The frame, which holds the generator, includes oppositely disposed structural members, a weight receptacle attached to the structural members and being located proximate the ground, a plurality of braces suspended above the weight receptacle to which the generator is affixed, a control panel housing attached to and extending longitudinally between the structural members, and a grappling attachment feature attached to the structural members opposite the weight receptacle.

The frame members may be square tubular members made of heavy gauge steel. In one aspect, the structural members may be formed in an inverted U-shape.

A fuel tank may be located within the frame between the generator and the grappling attachment feature. To protect the fuel tank from damage due to incidental or accidental contact with the grappling claws or hooks, the frame may include a pair of tank covers, which are removably attached to the structural members in the area of the fuel tank. The grappling attachment feature may also be provided with a pair of deflector plates proximate the fuel tank.

The weight receptacle may house a weight approximating 300 pounds, which has been found sufficiently heavy as to deter theft of the generator assembly. The weight may be a concrete material, such as quick-setting concrete allowed to harden or set within the weight receptacle. Alternately, or in addition, the weight may be steel bars that are bolted to the weight receptacle.

The frame may be provided with a splash guard to prevent splatter or damage from the loading of the weight receptacle. The splash guard may be secured to the bottom of the braces (that is, proximate the weight receptacle). For ease of access to the generator, the splash guard may define one or more openings therethrough.

The grappling attachment feature may be provided with a lift plate defining a hole therethrough for receipt of a grappling hook.

The foregoing and other aspects and advantages of the present disclosure will be apparent from the following description and the attached drawings, or can be learned through practice of the present subject matter.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 is an isometric view of a generator assembly, having a generator and a frame with a grappling attachment feature and a theft-deterring weight receptacle, according to one aspect provided herein;

FIG. 2 is an isometric view of a generator of FIG. 1, which includes an engine, an alternator, and a muffler;

FIG. 3 is an isometric view of the generator frame of FIG. 1, in which the generator has been removed to show the grappling attachment feature and the theft-deterring weight receptacle;

FIG. 4 is a cross-sectional view of the generator frame of FIG. 3, as taken along line IV-IV;

FIG. 5 is a bottom perspective view of the weight receptacle of the generator frame of FIGS. 1 and 3;

FIG. 6 is an isometric view of the grappling attachment feature of the generator frame of FIGS. 1 and 3;

FIG. 7 is an isometric view of an alternate generator frame, in accordance with a second aspect provided herein;

FIG. 8 is a cross-sectional view of the generator frame of FIG. 7, as taken along line VIII-VIII;

FIG. 9 is a bottom perspective view of an alternate weight receptacle of the generator frame of FIG. 7; and FIG. 10 is a plan elevational view of an alternate grappling attachment feature of the generator frame of FIG. 7.

DETAILED DESCRIPTION

Detailed reference will now be made to the drawings in which examples embodying the present subject matter are shown. The detailed description uses numerical and letter designations to refer to features of the drawings. Like or similar designations of the drawings and description have been used to refer to like or similar parts of various exemplary embodiments.

The drawings and detailed description provide a full and written disclosure of the present subject matter, and of the manner and process of making and using various exemplary embodiments, so as to enable one skilled in the pertinent art to make and use them, as well as the best mode of carrying out the exemplary embodiments. However, the examples set forth in the drawings and detailed description are provided by way of explanation only and are not meant as limitations of the disclosure. The present subject matter thus includes any modifications and variations of the following examples as come within the scope of the appended claims and their equivalents.

FIG. 1 illustrates a generator assembly 1 having a frame 10, a grappling attachment feature 20, a generator 30, and a weight tray 40. For ease of access, a fuel tank 37 may be positioned at the top of the generator assembly 1 or at any other convenient location. The generator 30 itself is operably connected to a control panel 39 and may be controlled by a user by manipulating the settings of the control panel 39. For protection of wiring and controls, the control panel 39 may be held within a housing constructed of metal, heavy duty plastics, or other similarly strong and durable materials. The control panel 39 is shown with various switches and dials, although other configurations (such as those shown in FIG. 7) may be employed, as desired.

The generator 30, as shown in FIG. 2, generally includes an engine 31, an alternator 33, and a muffler 35. The generator 30 is mounted, using rubber isolation mounts 19, to generator support beams 12. The generator support beams 12 may be attached to supporting frame members 16 (as in FIG. 3), for example, by welding or other attachment means. A splash guard 38 also may be provided at the underside of the support beams 12 to prevent the components of the generator 30 from being exposed to cement being poured into the weight tray 40.

Turning now to FIGS. 3 and 4, the frame 10 includes an oppositely disposed pair of frame members 2 having the shape of an inverted U, although separate frame members may be joined to form a similar shape. The central portions of the U-shaped frame members 2 (that is, those areas roughly parallel to the ground) support the grappling attachment feature 20, discussed further below. Transverse frame members 4 and longitudinal frame members 6 form a structural support for the fuel tank (37). The components of the control panel 39 (as seen in FIG. 1) are protected within a control panel housing 38, which extends longitudinally between the frame members 2 and may be bolted, welded, or otherwise secured to the frame members 6, 36.

Longitudinal frame members 16 provide support for a pair of transversely oriented generator support beams 12. If desired, a generator support beam 13 may be located between and perpendicular to the generator support beams 12, though a different arrangement of support beams may be used, such as the arrangement illustrated in FIGS. 7 through 9. The bottom of the frame 10 may include a pair of oppositely disposed, longitudinal support beams 46. The frame members 2, 4, 5, 16, and 46 may be made of heavy gauge steel in the shape of a tubular square, and the other support beams may be made of heavy gauge steel in a desired profile.

The theft-deterring weight tray 40 includes four side panels 42 and a bottom panel 44 that define a receptacle for holding a weight, such as concrete or steel bars that may be added to the weight tray 40 once the generator assembly 1 arrives at a work site. Alternately, the weight tray 40 may be pre-fabricated as a single unit (for instance, by welding the respective side panels 42 and the bottom 44 together) before assemblage within the frame 10. As seen in FIG. 5, the bottom of the weight tray 40 may include a plurality of reinforcing beams, such as oppositely disposed longitudinal beams 48 and transverse beams 49. The transverse beams 49 are generally parallel to one another and to the longitudinal support beams 46 and are generally perpendicular to the longitudinal beams 48. Different angular orientations of the beams could instead be used, if desired, and one such configuration having a different number of beams is shown in FIG. 9.

The grappling attachment feature 20 (seen in FIG. 6) includes oppositely disposed pairs of triangular panels 22. The spacing between the individual panels 22 of each pair corresponds to the dimensions of the frame member 2, and the individual panels 22 may be secured to the frame members 2 using bolts, for example, through the apertures at the bottom of the panels 22. Alternately, the panels 22 may be welded to the frame members 2, made integrally with the frame members 2, or secured by any other methods. A tubular bar 26 with a square cross-section extends through the panels 22, while a rectangular support panel 24 is positioned between the two innermost panels 22 in contact with the panels 22 and the support bar 26 for additional structural integrity.

The tubular square bar 26 and the support panel 24 form an inverted T-shape and could be replaced, if desired, with a unitary structure having such a shape. Another alternate construction (not shown) uses of an I-beam or structures assembled to have an I-shaped cross-section. FIGS. 7, 8, and 10 illustrate a grappling attachment feature 20' having a lifting plate 28, as discussed below. Whatever the particular construction, the grappling attachment feature 20 (or 20') may be readily engaged and transported by grappling claws or a grappling hook, as are commonly used in the railroad industry or in other pieces of construction equipment similarly outfitted with such claws or hooks for moving the generator assembly 1 from a transport vehicle to a job site (and vice versa).

FIGS. 7 through 10 are directed to an alternate configuration of the frame 10. For reference, the alternate frame will be referred to herein as frame 10', and the grappling attachment, the weight tray, and any other modified elements will be referred to with prime symbols as well (such as, the grappling attachment feature 20' and the weight tray 40') to differentiate these elements from those previously discussed.

Referring specifically to FIGS. 7 and 8, the generator frame 10' is constructed similarly to the generator frame 10, using an oppositely disposed pair of inverted U-shaped support beams 2, extending vertically along the height of the frame 10'; the transverse beams 4 and the longitudinal beams 6 defining a perimeter within which the fuel tank (not shown in this view) is housed; the longitudinal beams 16 providing support to the generator support beams 12; and the longitudinal support beams 46 providing support to the weight receptacle 40'. The frame 10' is equally well-suited for housing the generator 30, as shown in FIG. 2.

Beginning at the top of the generator frame 10', the grappling attachment feature 20' is provided with a lift plate 28 through which an opening 29 is defined for receipt of a crane hook. The lift plate 28 may be welded to the square bar 26, or secured by other means.

A deflector plate 21 may be provided on each side of the generator frame 20' and may be attached toward the lower portion of the triangular plates 22. The U-shaped frame 2 may further support a curved tank cover 15 along each side, which fit along the curved portions of the U-shaped frame 2 and protect the fuel tank (shown in FIG. 1) from damage due to contact from the grappling claw or crane hook. The deflector plates 21 perform a similar protective function. The tank (37) may be accessed by removing the tank cover 15, which may be secured to the frame members 2 with bolts.

The central portion of the frame 10' supports the control panel 39' and the generator (30, as shown in FIG. 2). The control panel 39' may include any number of switches, dials, electrical receptacles, and the like, as are necessary or desired. In this frame 10', three generator support beams 12 are positioned across the width of the generator frame 10' between the longitudinal frame members 16, although numbers and arrangements may be used with similar results. The support beams 12 are provided with apertures therethrough at various locations for securing the generator components to the support beams 12 using isolation mounts 19.

A splash guard 18' may be provided beneath the support beams 12 to protect the generator components from being splattered, dirtied, or damaged upon introduction of the weight material (such as concrete) into the weight tray 40'. Several openings 17 may be made in the splash guard 18' to permit access to the bolt areas, so that the generator components may be secured, serviced, or removed for service or replacement. For instance, a user of the generator assembly (1) may access the engine (31) for an oil change through one of the openings 17, thus maintaining the equipment in good operational condition without having to remove the engine (31) for service.

The weight tray 40' includes four side panels 42 and the bottom panel 44 that define a receptacle for receipt of a weight material, such as concrete or steel rods. The weight tray 40' is supported by the frame members 46 and a pair of longitudinal support beams 48 (seen most clearly in FIG. 9).

Both of the weight trays 40, 40' described herein have a capacity for holding a substantial amount of material by weight. It is contemplated that an added weight of between approximately 200 pounds and 300 pounds of material is sufficiently heavy to deter theft. It may be convenient to use quick-setting concrete as the weight material, because of its generally economical cost and ready availability. The weight tray 40 (or 40') is sized to accommodate up to six 50-pound bags of concrete mixed into a slurry with water, though fewer bags may be used if desired. In this case, the concrete mixture is prepared, poured into the weight tray 40 (or 40'), and allowed to harden. Alternately, or in addition, steel rods, plates, or the like may be bolted or flash-welded to the weight tray 40, thereby preventing their easy removal, in order to increase the weight of the generator assembly 1.

To further hinder would-be thieves from trying to procure the generator 30, a vertical brace 41 may be provided between the bottom 44 of the weight tray 40' and the splash guard 18', as shown in FIG. 8. The vertical brace 41, particularly when embedded in concrete, reduces the likelihood that a thief will try to simply cut through the frame members 2 and steal the generator components. The vertical brace 41 may also be welded to the splash guard 18' and the weight tray bottom 44 for security. While not specifically shown with reference to the frame 10 of FIG. 1, the vertical brace 41 may be similarly employed within the frame 10. Additionally, more than one vertical brace 41 may be used, if so desired.

FIG. 10 illustrates the grappling attachment 20' including the lift plate 28 that is welded, or otherwise secured, to the square cross-bar 26. The horizontal support plate 24 may also be provided for reinforcement of the grappling attachment 20'. As discussed above, the deflector plates 21 on each side of the grappling attachment 20' reduce the likelihood of the tank (37) or control panel (39) being damaged due to incidental contact with the grappling claw or crane hook.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A generator assembly comprising:
a generator having an engine, an alternator, and a muffler; and
a frame holding the generator, the frame comprising oppositely disposed structural members, a weight tray attached to the structural members and being proximate the ground, a plurality of braces suspended above the weight tray by which braces the generator is carried, a control panel in control communication with said generator, a grappling attachment feature attached to the structural members opposite the weight tray, and a fuel tank located within the frame between the generator and the grappling attachment feature, wherein the grappling attachment feature comprises a pair of deflector plates attached thereto, the deflector plates being located proximate the fuel tank.

2. A generator assembly comprising:
a generator having an engine, an alternator, and a muffler; and
a frame holding the generator, the frame comprising oppositely disposed structural members, a weight tray attached to the structural members and being proximate the ground, a plurality of braces suspended above the weight tray by which braces the generator is carried, a control panel in control communication with said generator, a grappling attachment feature attached to the structural members opposite the weight tray, and
a splash guard, the splash guard secured to the braces proximate the weight tray, wherein the splash guard defines therethrough one or more openings for accessing the generator.

* * * * *